US012102963B2

(12) United States Patent
Antonopoulos et al.

(10) Patent No.: US 12,102,963 B2
(45) Date of Patent: Oct. 1, 2024

(54) SEAWATER TREATMENT TO OBTAIN HIGH SALINITY WATER WITH LOW HARDNESS FOR ENHANCED OIL RECOVERY

(71) Applicant: BL Technologies, Inc., Minnetonka, MN (US)

(72) Inventors: Nick Antonopoulos, Southborough, MA (US); Michael Doupe, Guelph (CA); Tamizh Aruvi Kanagasabai, Bangalore (IN); Ravi Chandra Reddy Kapa, Dubai (AE); Irving Elyanow, Lexington, MA (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 351 days.

(21) Appl. No.: 17/608,081

(22) PCT Filed: Apr. 13, 2020

(86) PCT No.: PCT/US2020/027957
§ 371 (c)(1),
(2) Date: Nov. 1, 2021

(87) PCT Pub. No.: WO2020/226853
PCT Pub. Date: Nov. 12, 2020

(65) Prior Publication Data
US 2022/0314167 A1 Oct. 6, 2022

(30) Foreign Application Priority Data
May 7, 2019 (IN) .............................. 201911018156

(51) Int. Cl.
B01D 61/02 (2006.01)
B01D 61/08 (2006.01)
(Continued)

(52) U.S. Cl.
CPC ......... *B01D 61/029* (2022.08); *B01D 61/025* (2013.01); *B01D 61/027* (2013.01);
(Continued)

(58) Field of Classification Search
CPC .. B01D 61/025; B01D 61/027; B01D 61/029; B01D 61/12; B01D 2317/022; B01D 2317/04; C02F 1/441; C02F 1/442
See application file for complete search history.

(56) References Cited

U.S. PATENT DOCUMENTS

2014/0352958 A1* 12/2014 Van Batenburg ..... E21B 43/162
166/268

FOREIGN PATENT DOCUMENTS

CN 102803148 A 11/2012
JP 2003200161 A 7/2003
(Continued)

OTHER PUBLICATIONS

BP PLC, "Understanding the LoSal Mechanism", 2010 IEA EOR Workshop & Symposium, Aberdeen, Scotland, Oct. 18-20, 2010.
(Continued)

Primary Examiner — Bradley R Spies

(57) ABSTRACT

A high salinity feed water such as seawater is treated to produce a reverse osmosis (RO) concentrate and an RO permeate. Optionally, some or all of the RO concentrate may be filtered to produce a nanofiltration (NF) permeate. Optionally, some feed water can also be filtered to produce NF permeate without first being concentrated by RO treatment. The NF permeate, or a blend of the RO permeate and NF permeate, may be used to produce a product water for injection into an oil-bearing reservoir to enhance oil recovery. Optionally, the product water may have salinity greater than the feedwater, or at least 30 g/L. The product water may have hardness of less than 20 mg/L.

10 Claims, 1 Drawing Sheet

(51) Int. Cl.
    *B01D 61/12*     (2006.01)
    *C02F 1/44*     (2023.01)
    *C02F 103/08*     (2006.01)

(52) U.S. Cl.
    CPC ............. *B01D 61/08* (2013.01); *B01D 61/12* (2013.01); *C02F 1/441* (2013.01); *C02F 1/442* (2013.01); *B01D 2311/06* (2013.01); *B01D 2311/08* (2013.01); *B01D 2317/022* (2013.01); *B01D 2317/08* (2013.01); *C02F 2103/08* (2013.01); *C02F 2209/40* (2013.01)

(56) References Cited

FOREIGN PATENT DOCUMENTS

| | | |
|---|---|---|
| JP | 2009172462 A | 8/2009 |
| JP | 2017104787 A | 6/2017 |
| JP | 2017124382 A | 7/2017 |
| JP | 2018086649 A | 6/2018 |
| WO | 2007138327 A1 | 12/2007 |
| WO | 2011086346 A1 | 7/2011 |
| WO | 2018178019 A1 | 10/2018 |
| WO | 2019053092 A1 | 3/2019 |

OTHER PUBLICATIONS

GCC Patent Application No. 2020/39571, Office Action dated Jul. 31, 2021.
Algerian Patent Application No. DZ/P/2021/000734, Office Action dated Jun. 8, 2022.
International Patent Application No. PCT/US2020/027957, International Search Report and Written Opinion, dated Jul. 23, 2020.
International Patent Application No. PCT/US2020/027957, International Preliminary Report on Patentability, dated Nov. 18, 2021.
Chinese Application No. 202080033963.5, Office Action dated Feb. 27, 2023.
Chinese Application No. 202080033963.5, Office Action dated Sep. 15, 2023.
Chinese Application No. 202080033963.5, Office Action dated Dec. 26, 2023.
Japanese Application No. 2021565914, Office Action dated Mar. 12, 2024.
Argentinian Application No. P200102454, Office Action dated Nov. 23, 2023.
Liu, Dexin Dongying, "Oilfield Sewage Treatment", China University of Petroleum Press, 2015, p. 304.
Brazilian Application No. 112021022109-3, Office Action dated Jun. 17, 2024.

* cited by examiner

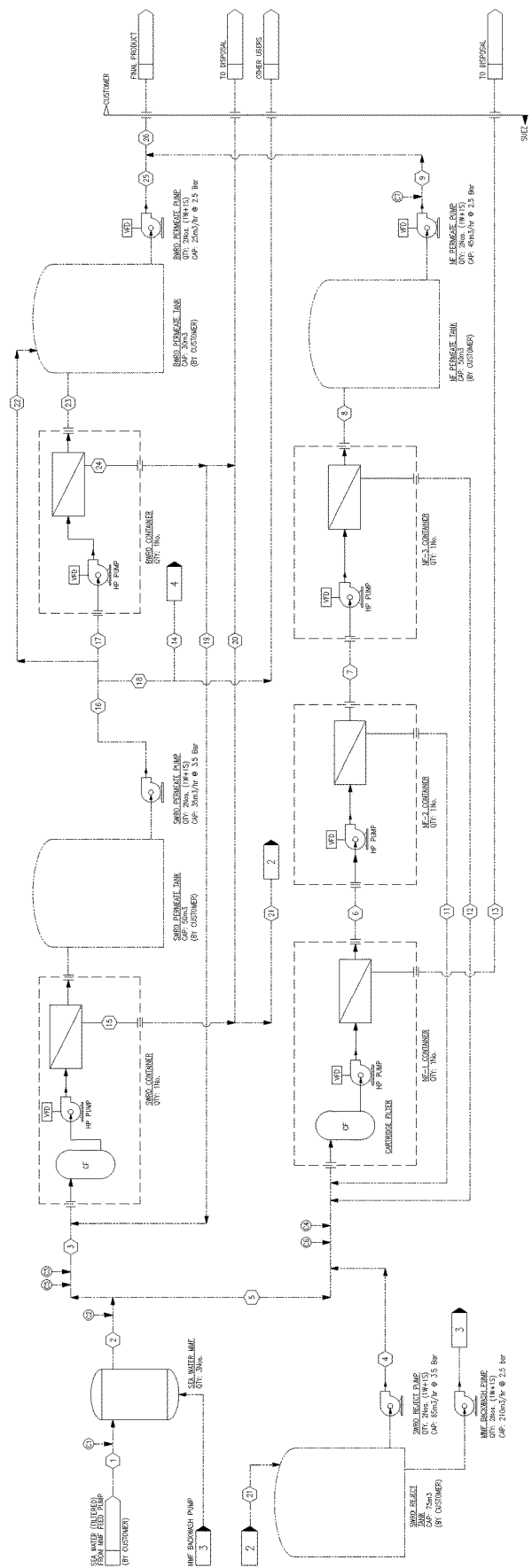

SEAWATER TREATMENT TO OBTAIN HIGH SALINITY WATER WITH LOW HARDNESS FOR ENHANCED OIL RECOVERY

CROSS-REFERENCE TO RELATED APPLICATIONS

This application is a National Stage Entry of International Application No. PCT/US2020/027957, filed Apr. 13, 2020, which claims the benefit of Indian Patent Application Serial No. 201911018156, filed May 7, 2019, which is incorporated by reference.

FIELD

This specification relates to treating seawater to produce water for injection into an oil-bearing reservoir.

BACKGROUND

International Publication Number WO 2019/053092 A1, Method of Controlling Salinity of a Low Salinity Injection Water, describes a method that includes producing two blends of low salinity water for injection into two injection wells in different regions of an oil-bearing reservoir. The blends comprise variable amounts of nanofiltration permeate and reverse osmosis permeate, both produced by filtering high salinity feed water such as seawater.

INTRODUCTION

In a method described herein, a high salinity feed water such as seawater is treated to produce a reverse osmosis (RO) concentrate and an RO permeate. The RO concentrate (alternatively called reject) is filtered to produce a nanofiltration (NF) permeate. Optionally, some feed water can also be filtered to produce NF permeate without first being concentrated by RO treatment. The NF permeate, or a blend of the RO permeate and NF permeate, may be used to produce a product water for injection into an oil-bearing reservoir. The product water may have salinity of 30 g/L or more, for example in the range of 30 g/L to 50 g/L. Optionally, the product water may have salinity greater than the feedwater, for example greater than seawater (typically about 35 g/L TDS or greater than 40 g/L TDS). The product water may have hardness of less than 20 mg/L. The salinity and hardness of the product water may be varied, optionally over time, or kept nearly constant despite changes in the feed water, for example by altering a percentage of feed water processed by NF treatment that is RO concentrate, and/or by altering a blend ratio between RO permeate and NF permeate in the product water.

A system described herein has an RO system and an NF system. An inlet to the RO system is connected to a source of feed water. An inlet to the NF system is connected to a source of feedwater. A concentrate outlet of the RO system is connected to a feed inlet of the NF system. A permeate outlet from the NF system is connected to the injection system, for example through a holding tank. A permeate outlet form the RO system is connected to the injection system, for example through a holding tank. The injection system is adapted to inject water comprising RO permeate and/or NF permeate, wherein the NF permeate may include treated RO concentrate at least at some times, into an oil-bearing reservoir. The system has a suitable arrangement of pipes and valves (or other flow control devices) such that various ratios of flows in the system may be altered, optionally automatically or through a controller, optionally over time. For example, a controller may manipulate flow control or other devices to vary one or more of (a) the relative amounts of feed water that flow to the inlet of the RO unit relative to the NF unit, (b) the amount if any of RO concentrate that flows to the NF unit, (c) and the relative amount of RO permeate and NF permeate in the product water.

BRIEF DESCRIPTION OF THE FIGURES

FIG. 1 is a schematic diagram of a water treatment system.

DETAILED DESCRIPTION

Water is a key constituent in many enhanced oil recovery (EOR) and chemically enhanced oil recovery (CEOR) techniques, which may be employed on land or offshore. Key parameters such as salinity and hardness are preferably maintained within acceptable ranges to produce a useful fluid for injection. Different oil-bearing reservoirs and different flooding stages within the same reservoir may require injection water of different salinity. Preferably, a water treatment system can provide product waters of different salinities, ideally with minimal or no manual intervention. The feed water is most often seawater. Seawater typically has a salinity of 35 g/L (measured as total dissolved solids, TDS) or more when collected but when pre-treated to remove suspended solids its salinity may be 40 mg/L or more. The hardness (total hardness as $CaCO_3$) of seawater may be 6500 mg/L or more, with very little if any removed in the pre-treatment.

In some examples, a system described herein can be used to produce treated water of variable salinity. The system may be used to treat feed water of varying salinity levels, for example 35 g/l-50 g/l or 40 g/l-50 g/l TDS, and create product fluids that may have less than 20 mg/l hardness (total hardness as $CaCO_3$). Optionally, the system may maintain a generally constant effluent salinity over a period of time during which the feed water salinity varies. The salinity of the product water may be between 30 g/l TDS and 50 g/l TDS, which is desirable for use in at least some oil-bearing reservoirs of the world. In some examples the system has the capacity to produce product water with different salinity at different times. Optionally, the system may be modular so that is can be more easily moved from site to site, or scaled in size. The system may include an RO system and an NF system with suitable auxiliary equipment such as pipes, pumps, tanks, valves and other control devices, sensors, and one or more controllers.

In a process described herein water is treated with RO and/or NF membranes to produce different outlet streams. The different outlet streams can be mixed in different proportions to create product water having selected characteristics. The feed water may be pre-treated, for example with one or more solid-liquid separation units, to protect the membranes.

The product water may be treated with polymers. The product water may be produced according to the requirements for specific oil-bearing reservoirs and polymer blends. The system optionally includes digital controls to track fluid properties or modulate the blending of different streams.

The system and method feed a selected amount of RO concentrate into an NF system. This helps, along with optional variable blending of RO permeate with NF permeate, to allows modification of product TDS. By using RO concentrate, we concentrate hardness as well as TDS. However, the NF units (which may be multiple pass, i.e. 3 pass) remove hardness (and typically other potential scaling ions such as sulfate) while maintaining most of the desirable monovalent salinity (i.e. NaCl).

The product water may have (a) one or more of total hardness as $CaCO_3$ below 20 mg/L or below 10 mg/L and sulfate less than 10 mg/L, with (b) TDS greater than 30,000 mg/L or greater than 35,000 mg/L. The system produces high TDS product water with low hardness without requiring salt to be added to the product water.

FIG. 1 shows an example of a water treatment system. In the top line, a portion of feed water flows in line 3 to a seawater RO (SWRO) unit. The feed water in this example is filtered and seawater but other sources of feedwater and other pre-treatments may be used. Permeate from the seawater RO unit (SWRO permeate) is further treated in a brackish water RO (BWRO) unit. This produces brackish water RO permeate (BWRO) permeate. The use of the BWRO unit is optional and may be omitted. In another option, a bypass line around the BWRO unit may be provided, optionally with one or more controllable valves, such that a selected portion of the SWRO permeate bypasses the BWRO unit. Generally speaking, an SWRO units may produce permeate with a TDS or salinity of about 1000 mg/L and very little hardness. A BWRO unit may produce permeate with almost no salinity and almost no hardness (i.e. the permeate may be potable). The presence of a BWRO unit or not, or the extent to which it is by-passed, can be used to alter the qualities of the RO permeate. Optionally, the SWRO unit and or the BWRO unit may have one or more stages.

Some of the feed water optionally flows in line 5 to one or more NF units. The division of feed water between lines 3 and 5 is preferably controllable and variable for example through a range between 0-100% in line 3 or line 5. In some examples, there may be no flow through line 3, or no flow through line 5, at some or all times. In some examples, there is always at least some flow through line 3. The NF units can also selectively receive SWRO reject from line 21. In another option, not shown, the NF units can also selectively receive BWRO concentrate. The amounts of RO concentrate sent to the NF units, if any, can be varied. In some examples, at least some RO concentrate, for example SWRO concentrate, is sent to the NF units, at some or all times.

The NF system may have one or more stages. In the example shown, a triple pass RO system may be used. Some or all of the NF permeate (at line 9) can be blended with some or all of the RO permeate (at line 16 or 25 or a blend of them) to create the final product water. The final product water can be injected into an oil-bearing formation, optionally after being mixed with one or more chemicals, to enhance oil recovery.

Generally speaking, the optional and/or controllable elements of the system in FIG. 1 can be used to produce one or more qualities in the final product water. It is usually desirable that the final product water has low hardness, for example, less than 20 mg/L hardness as $CaCO_3$. However, the requirement for salinity (or TDS) of the final product water may vary in time or location and may be more or less than the salinity of the feed water. The system shown in FIG. 1 is typically capable of producing final product water with hardness less than 20 mg/L when feed with ordinarily pre-treated sea water (i.e. sea water that has been treated by one or more of a clarifier, dissolved air filtration unit, media filter and microfiltration or ultrafiltration membrane or similar treatment units). The system shown in FIG. 1 is also capable of receiving feed water with up to 50 g/L salinity and producing final product water with more, less, or the same salinity as the feed water.

We claim:

1. A method of treating water comprising,
    treating a portion of feedwater by way of reverse osmosis to produce an RO permeate and an RO concentrate;
    treating a portion of the RO concentrate by way of nanofiltration to produce NF permeate;
    optionally treating a portion of the feedwater by way of nanofiltration to produce additional NF permeate;
    using the NF permeate or a blend of the RO permeate and the NF permeate as a product water to be injected in an oil-bearing formation;
    wherein the product water has a salinity greater than the salinity of the feedwater.

2. The method of claim 1 wherein the feedwater has a salinity of 35 g/L TDS or more, or the feedwater comprises seawater.

3. The method of claim 1 wherein the product water has a salinity of 40 g/L TDS or more.

4. The method of claim 1 wherein the feedwater comprises sea water and the product water has less than 20 mg/L hardness as $CaCO_3$.

5. A water treatment system comprising,
    an RO system;
    an NF systmem,
    wherein an inlet to the RO system is connected to a source of feedwater and a concentrate outlet of the RO system is connected to a feed inlet of the NF system, and the NF system and the RO system are configured to produce a product water having a salinity greater than the salinity of the feedwater.

6. The system of claim 5 wherein an inlet to the NF system is connected to the source of feedwater.

7. The system of claim 5 wherein a permeate outlet from the NF system is connected to an injection system and a permeate outlet form the RO system is connected to the injection system.

8. The system of claim 5 wherein the injection system is adapted to inject the product water comprising RO permeate and/or NF permeate, wherein the NF permeate may include treated RO concentrate at least at some times, into an oil-bearing reservoir.

9. The system of claim 5 having a suitable arrangement of pipes and valves or other flow control devices such that various ratios of flows in the system may be altered, optionally automatically or through a controller, optionally over time.

10. The system of claim 5 wherein a controller may manipulate flow control or other devices to vary one or more of (a) the relative amounts of feed water that flow to the inlet of the RO unit relative to the NF unit, (b) the amount if any of RO concentrate that flows to the NF unit, (c) and the relative amount of RO permeate and NF permeate in the product water.

* * * * *